July 26, 1966  P. GRAHAM  3,262,716
VEHICLE OCCUPANT SAFETY BARRIER
Filed June 10, 1965  4 Sheets-Sheet 1
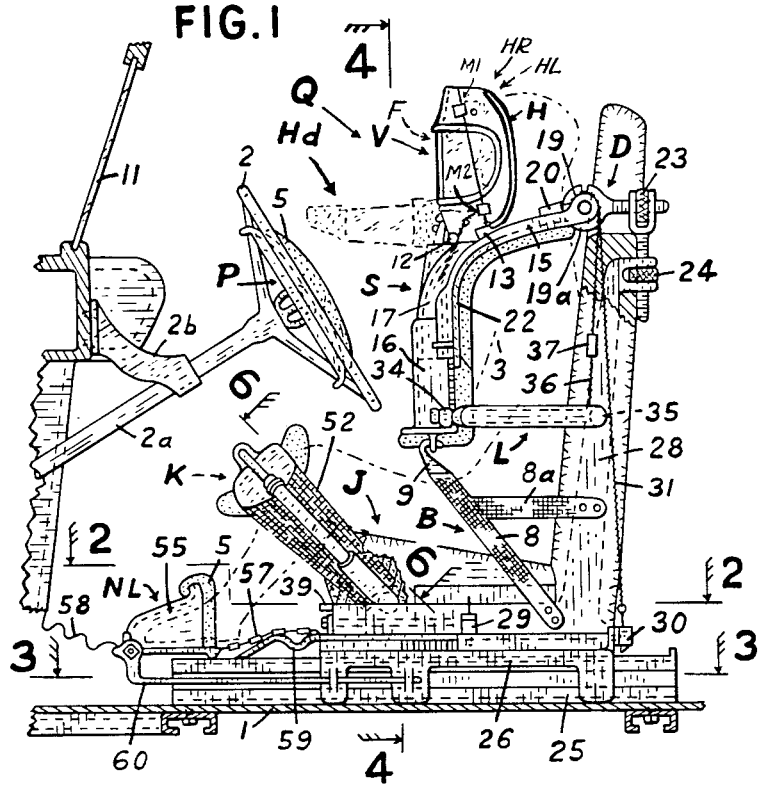
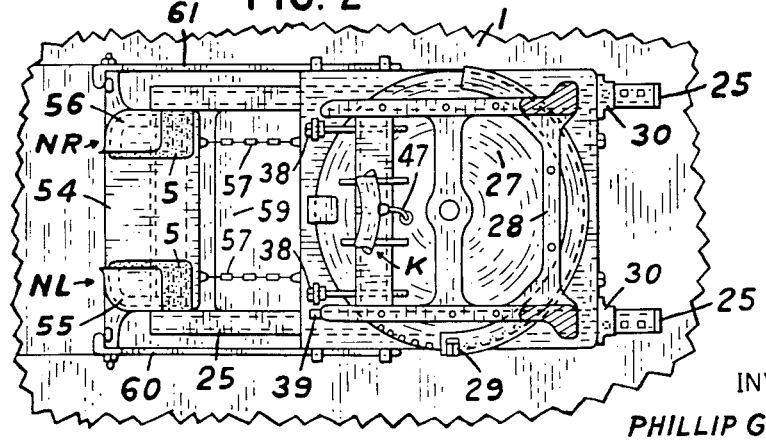
INVENTOR.
PHILLIP GRAHAM
BY *William J. Ruano*
ATTORNEY July 26, 1966  P. GRAHAM  3,262,716
VEHICLE OCCUPANT SAFETY BARRIER
Filed June 10, 1965  4 Sheets-Sheet 2
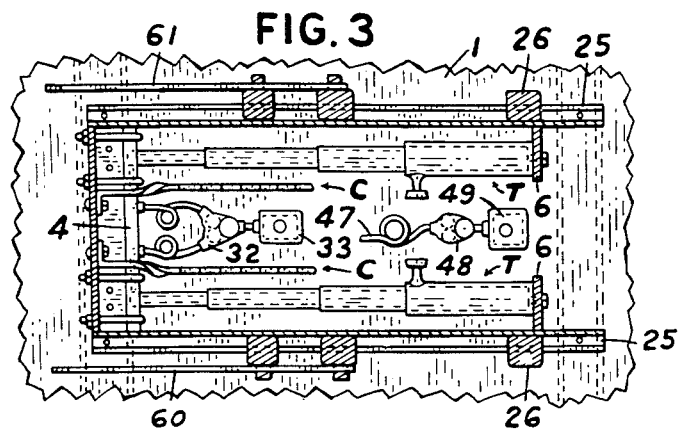
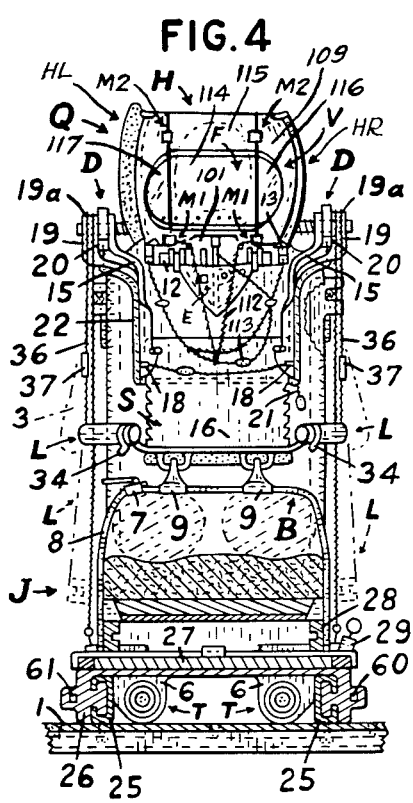
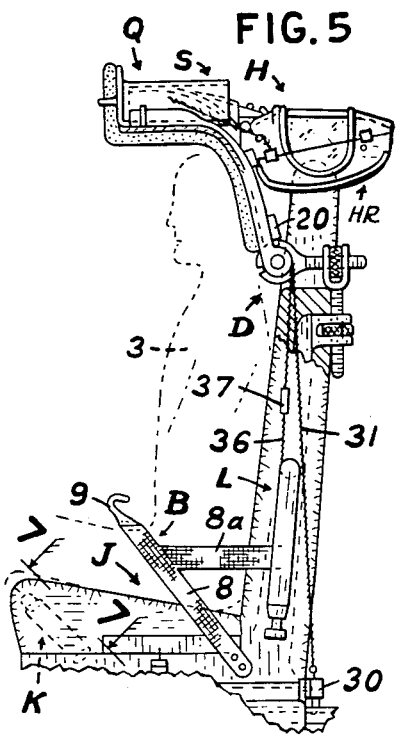
INVENTOR
PHILLIP GRAHAM
BY *William J. Ruano*
ATTORNEY

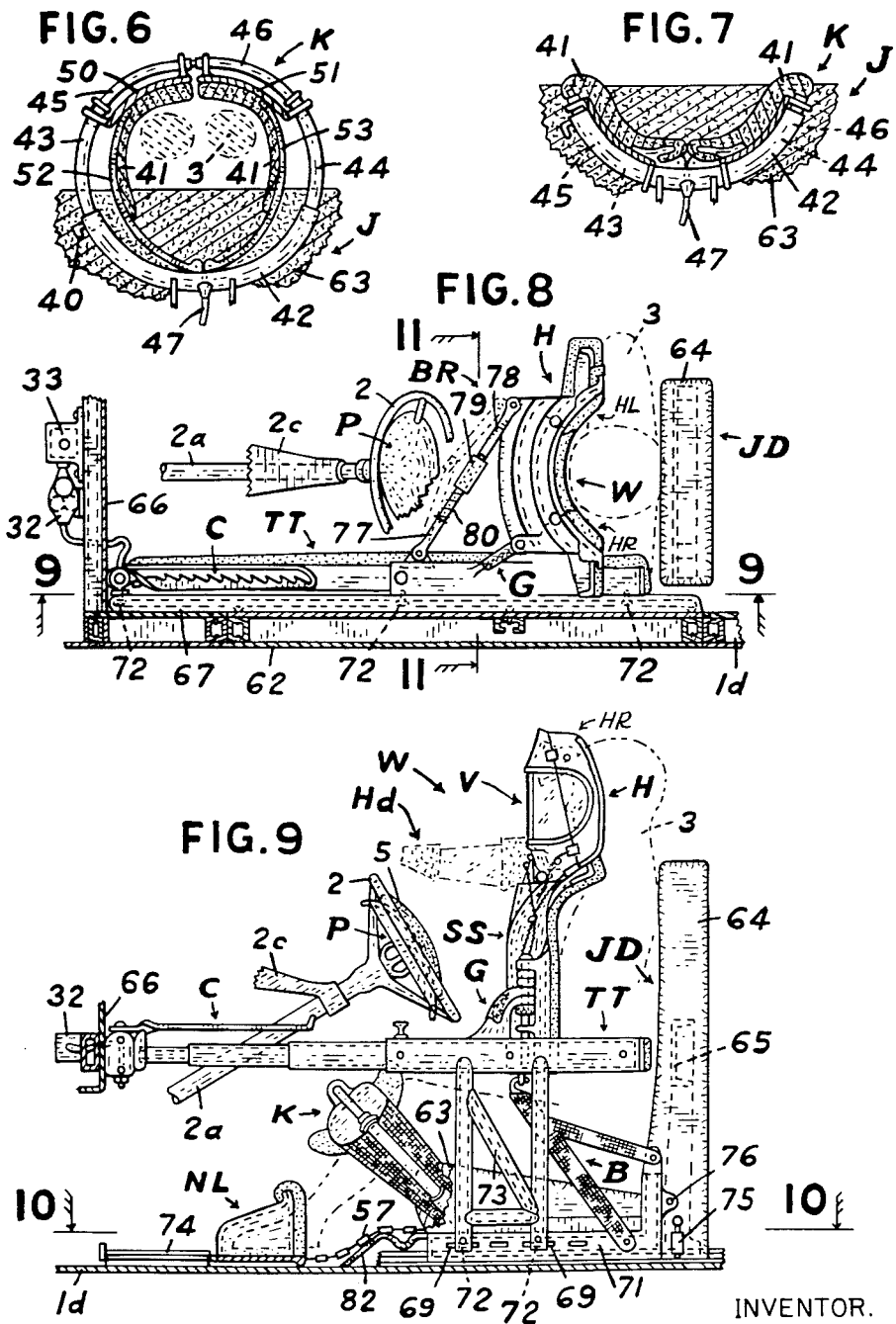

July 26, 1966 P. GRAHAM 3,262,716
VEHICLE OCCUPANT SAFETY BARRIER
Filed June 10, 1965 4 Sheets-Sheet 4
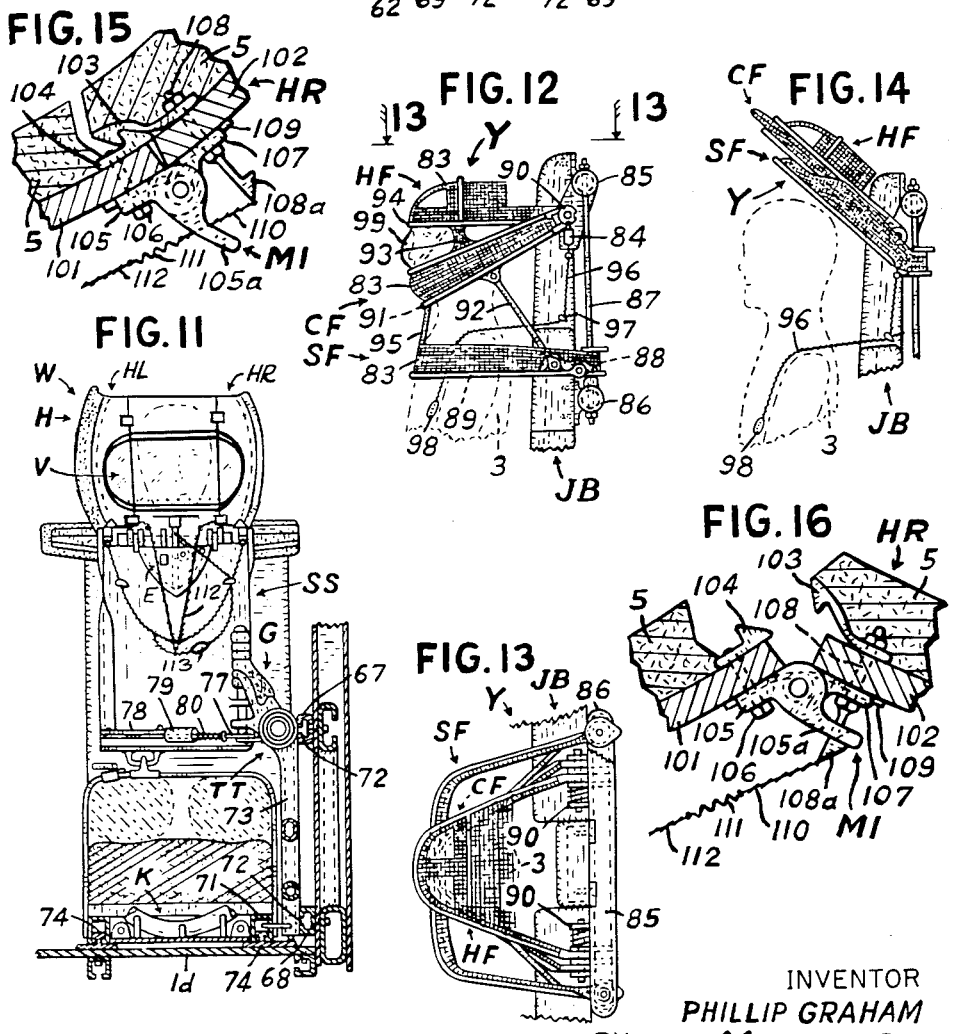
INVENTOR
PHILLIP GRAHAM
BY William J. Ruano
ATTORNEY United States Patent Office 3,262,716
Patented July 26, 1966

1

3,262,716
VEHICLE OCCUPANT SAFETY BARRIER
Phillip Graham, 2825 Glenmore Ave., Pittsburgh, Pa.
Filed June 10, 1965, Ser. No. 462,993
6 Claims. (Cl. 280—150)

This invention relates to a vehicle occupant safety barrier that is mounted in a vehicle and has yieldable shielding mounted closely in front of a seat for an occupant to protect the occupant during a rapid deceleration especially that caused by a collision. More particularly, it relates to a cushioning barrier that may be positioned in an automobile in front of an operator or a passenger, to furnish a high degree of cushioning to the occupant, including safe cushioning of the lower portion of the occupant's body. The barrier may be positioned between an operator and a steering wheel or the like to maintain protection for the operator while allowing him freedom of movement in operating the vehicle, including operating the vehicle throughout an accident period when the vehicle remains controllable. The barrier may be mounted so a portion of more of it can be kept in a retracted position so it need not objectionably obscure or obstruct the occupant except when the retracted portion is moved into a shielding position in front of the occupant during a collision threat. This invention is a continuation-in-part of my co-pending application Serial No. 355,568, which has been abandoned, filed March 30, 1964, entitled Vehicle Occupant Safety Barrier. Applicant also claims rights to earlier filing date to common subject matter that is described in the present application, which was also described in his application Serial No. 97,658, filed March 22, 1961, now Patent No. 3,129,017, entitled Vehicle Occupant Safety Barrier, and application Serial No. 662,770, filed May 31, 1957, entitled Vehicle Occupant Safety Barrier, now Patent No. 2,977,135. The co-pending application Serial No. 355,568 is a division of application Serial No. 97,658 and application Serial No. 97,658 is a continuation-in-part of application Serial No. 662,770.

The barrier has means to act during a high degree of deceleration of a vehicle, particularly the quick deceleration caused by a collision or extreme braking, to adequately cushion an occupant when he is propelled against it by momentum. The barrier also confines the occupant to prevent the momentum from throwing him against rigid portions of the vehicle and the like. The barrier provides stiff shielding and has large cushioning surfaces that become bearing surfaces against the occupant's body during a collision. The large bearing area allows a low bearing pressure to safely transmit the occupant's momentum force into the barrier, the barrier yielding to an extent as the force is absorbed. There is means to prevent objectionable rebounding of the barrier against the occupant. A barrier may have other safety features including means operative during a very violent collision to cause the momentum force of the occupant's body to be harnessed to the barrier to force it to act as a battering ram to bend the steering wheel, steering column, dash board, and other rigid objects confronting it to provide a longer path in which the occupant can decelerate slower and thus safer by reducing the intensity of the bearing pressure of his body against the barrier.

The barrier of the present invention has improvements over the barrier shown in my Patent No. 3,129,017. The present application describes improvements that include retraction by folding of rigid side flap portions of a rigid head shield. Without such folding, these rigid side portions would objectionably obscure portions of the occupant's head and obstruct to an extent, the occupant's views towards the sides of a roadway. There are automatic means to move these rigid side positions into protective positions confronting the side portions of the occupant's head. In addition, the shield means is improved so it provides more unobstructed space for an operator to move his arms when operating the vehicle. The present invention also includes improvements to a compacted flexible shield by providing a strong flexible transparent plastic eye shield to protect occupant's eyes from flying particles of broken glass during a collision.

Although the vehicle barrier is shown as being incorporated into an automobile, it may be incorporated into other vehicles, including buses, trucks, aircraft, military tanks, speedboats, scooters, snow sleds, and the like. Furthermore, although I have illustrated the barrier as it would be positioned in protecting the operator of a vehicle, such barriers may also be positioned in front of passengers.

An object of my invention is to provide a shield-like, cushionable vehicle safety barrier that is mounted in a vehicle with shielding positioned closely in front of the occupant, the shielding including a movable head shield having hinged side flap portions that confront the sides of occupant's head. The head shield may be kept in a low retracted position with the side flap portions unfolded to an unobjectionably position them lower than the occupant's head, until a dangerous traffic condition occurs. Then a control may be tripped to cause the side flap portions to automatically fold back and to cause the whole head shield to automatically move into a position so as to protect the occupant.

Another object of my invention is to provide a cushioning vehicle safety barrier that has a movably mounted flexible head shield that includes a flexible transparent eye shield. The head shield is retracted until a dangerous traffic condition occurs, and the retraction causing the head shield to be compacted so it fits into a small space where it does not objectionably obscure or obstruct the occupant.

Other objects and advantages of the invention will become more apparent from a study of the following description taken with the accompanying drawings wherein:

FIG. 1 is a fragmentary side elevational sectional view showing barrier shields positioned in front of the operator of an automobile;

FIG. 2 is a fragmentary sectional view taken along line 2—2 of FIG. 1;

FIG. 3 is a fragmentary sectional view taken along line 3—3 of FIG. 1;

FIG. 4 is a fragmentary sectional view taken along line 4—4 of FIG. 1;

FIG. 5 is a view similar to FIG. 1, except that it shows barrier shields in retracted positions;

FIG. 6 is a fragmentary sectional view taken along line 6—6 of FIG. 1;

FIG. 7 is a fragmentary sectional view taken along line 7—7 of FIG. 5;

FIG. 8 is a fragmentary sectional plan view showing a modification having much of the barrier device mounted on a vehicle door;

FIG. 9 is a fragmentary sectional view taken along line 9—9 of FIG. 8;

FIG. 10 is a fragmentary sectional view taken along line 10—10 of FIG. 9;

FIG. 11 is a fragmentary sectional view taken along line 11—11 of FIG. 8;

FIG. 12 is a fragmentary side elevational view showing a modification of the torso shield and head shield shown in FIG. 1;

FIG. 13 is a fragmentary plan view taken along line 13—13 of FIG. 12;

FIG. 14 is a fragmentary elevational view similar to FIG. 12 showing the head shield and torso shield in a retracted position;

FIG. 15 is an enlarged fragmentary plan view showing details of latching means and hinging means that can hold a head shield side flap in a protective position;

FIG. 16 is a view similar to FIG. 15, but showing the latching of the side flap in a low non-obscuring position.

Referring more particularly to the drawings, FIGS. 1 to 7 inclusive show a pivotable retractable shield-like cushionable safety barrier Q that is mounted on a slidable seat J of an automobile body 1. The barrier Q is like the barrier units that comprise a torso shield and a head shield which are described in detail in my Patents No. 2,977,135 and No. 3,129,017.

The barrier Q is shown in a protective position in FIGS. 1 and 4. FIG. 5 shows the barrier Q in a retracted position. The barrier Q is symmetrical in general. The barrier Q has a strong rigid torso shield S that shields the front of the occupant's torso. The shield S is positioned between the steering wheel 2 and the occupant or operator 3. The shield S is pivotally mounted with two supports D that are fastened to the top of the slidable seat J. The barrier Q has a pivotally mounted head shield H attached to the upper portion of the shield S with hinges and latching means, including a latch E. A flexible visor-like forehead shield F is hinged to the inside of the head shield H. The shield F is useful as a sun shade and as an adjustable shield to cushion and protect the forehead of an occupant. The head shield H includes pivotally mounted side flaps HR and HL, which confront the sides of the head of the occupant. The side flaps are important improvements of the present invention. Details of the side flaps are shown in FIGS. 15 and 16. A detailed description of the side flaps will be included further on.

A pair of telescoping, cushioning thrust arms or cylinders T are positioned below the sliding seat J. During a violent deceleration such as that from a collision, the occupant 3 would be propelled forward from his position shown in FIG. 1 to a position against the barrier Q. The momentum thrust of the occupant 3 against the shields confronting him transmits the thrust into the shields which transmits the thrust to the slidable seat J and the seat yields and transmits the thrust to the cylinders T which yield and absorb the thrust. The forward ends of the cylinders T are fastened to a diaphragm 4. The diaphragm 4 is connected to fixed framing at the floor of the automobile body 1. The rear ends of the cylinders T are engaged to the rear of seat J. Catches C on cylinders T prevent objectionable rebounding of cylinders T.

A retractable knee shield K is mounted on the forward portion of the seat J to shield and cushion the occupant's knees and the portions of the occupant's legs that are adjacent to the knees. The knee shield K also cushions at least a portion of the momentum of the lower portion of the occupant's torso and the upper portions of the occupant's legs. The knee shield K may be kept retracted in the position within the seat J as shown in FIGS. 5 and 7. When a collision seems imminent, the shield K is triggered so it is forced out into the protective circle-like position shown in FIGS. 1 and 6. The shield K restrains the occupant's body from sliding under the barrier Q during a collision, particularly when a safety belt B is not used. The shield K moves forward in unison with the seat J during a rapid deceleration. The shield K takes the momentum thrust from or near the knees of the occupant 3 and transmits the force into the seat J which yields and transmits the force into cylinders T.

Stiff foot shields NR and NL are attached to the seat J with chains. The shields NR and NL are open at the rear and at opposing sides to allow the occupant 3 to position his feet within these shields just before a collision so as to restrain and cushion his feet during a rapid deceleration. The shields NR and NL move forward in unison with the other shields, belt B, and the seat J. The forward movement of shields NR and NL is halted when these shields strike non-yielding obstruction such as deforming portions of the automobile body 1. The shields NR and NL may be pushed back towards the seat J by deforming portions of the automobile body, 1, their stiff shielding and padding preventing injury to occupant's feet.

All of the shields may have cushioning lining or padding 5 attached to the surfaces that are adjacent to the occupant 3. The head shield H has stiff transparent face or eye shield means V. A stiff dished buffer plate P may be attached to the steering wheel 2 to act as a shield to restrain a broken steering wheel 2, steering column 2a, or the like from piercing the shields S and H and/or the occupant 3 during a collision. The cylinders T, catches C, shields S, and F, buffer P and latch E, and most of the head shield H are described and shown in detail in my Patent No. 2,977,135.

The barrier Q, shields K, NR and NL would not touch the occupant 3 except during a collision when he bears against them. When the barrier Q is positioned as shown in FIG. 1, it automatically protects an operator without restricting his freedom of movement to drive, thus it causes him to feel relatively safe while driving. Therefore, he can remain at the controls of the automobile in the face of a collision and concentrate on trying to avoid having a collision rather than abandon the controls and try to shield his head with his arms, or try to gain a prone position on the seat J.

A pair of retractable side arms L may be used to prevent the barrier Q from being bent out of protective position by momentum thrusts of the occupant 3 against it or by the steering wheel 2 being deformed backwards against it. The arms L are needed if the barrier Q is to be harnessed to make it act as a battering ram to bend or break the steering wheel 2.

When the barrier Q, shields K, NR and NL act as a battering ram with the momentum of the occupant 3, shields and the seat J supplying the force, the deceleration path is lengthened allowing the occupant 3 to be decelerated slower and thus more safely.

During a very violent collision the operator's body will move forward until it touches the cushioning on the shields. The shields and the belt B take most of the momentum force of the operator's body and transmits it into the sliding seat J and from there it is transmitted into the cushioning cylinders T. The remainder of the forces spent by bending and breaking the rigid portions of the automobile confronting the occupant, including the dash, the steering wheel 2, and the steering wheel column 2a. The shield S engages the buffer P in deforming the steering mechanism. When the firewall and dash board portion of the auto body 1 is being pushed inwardly by a colliding object, the momentum force of the operator's body against the barrier Q resists the penetration force and possibly pushes those auto body portions outwardly.

The shield S has a strong stiff curved panel 17 that can greatly resist forces that tend to buckle it during a collision.

An adjustable extension panel 16 may be attached to the lower portion of the panel 17 to allow the shield S to be adjusted in length vertically to suit the stature of the occupant and to allow the panel 16 to engage the lower portion of the wheel 2 during a collision. Thus shielding the torso from the wheel 2 and allowing the shielding to act as a battering ram. There are a series of adjusting notches along the edges of the panel 16 to which the pair of latches 18 on the panel 17 may be selectively engaged.

The operator 3 in the arrangement shown in FIG. 1 can push his seat back to allow access space for pivoting the shield S upwardly or downwardly past the steering wheel 2. The shield extension panel 16 may be slid into further engagement with panel 17 to shorten the shield S so it can be pivoted past the wheel 2. Removable pins in panel 16 may be turned to disengage them so panel 16 may be removed. Panel 16 may have spring means and tripper (not shown) to raise the panel, so it can be pivoted upwards past the steering wheel 2. Panel 16 would protect operator from the wheel. Other occupants may have barriers without the panel 16.

The occupant 3 is confined by the shoulder supports 15 and belt B to prevent him from rising excessively above the seat J during a roll-over.

Springs are confined in the tubes of the cylinders T. These springs are compressed during a collision when the occupant's momentum forces the shields to transmit the collision force into the seat J and then into the cylinders T. The catches C prevent the release of the forces built up in the cylinders T until they are manually released after the occupant is clear of the path into which the shields rebound. Snubbers similar to those described in my Patent No. 2,827,305 may be used if preferred, rather than catches C.

The catches C are shielded so the occupant's legs cannot be injured by them. The cylinders T may have pistons and hydraulic fluid to create bleeding action to cushion some of the collision momentum force. The hydraulic means to cushion may be in addition to the spring means. The means to use hydraulic bleeding action to cushion the momentum force is fully described in my Patent No. 2,977,135. This Patent No. 2,977,135 also describes fully the hydraulic means that allows the use of hydraulic fluid and pump means to adjust the seat J and the shields laterally towards the rear or forwardly.

The seat J is pivotally mounted to allow it to be pivoted laterally for easier access and for skewing the shields when a diagonal collision is likely to occur, to allow the operator 3 to meet a thrust more directly to obtain the maximum cushioning effect and to reduce or eliminate the force factors that tend to hurl him towards a side of the compartment. Most operators veer to the right just before a collision on a two lane highway, causing a collision thrust from the front left. The thrust from the left requires the operator to pivot the seat J to the left to position the barrier shields and his body so they are faced directly towards the collision impact point. Many collisions occur on sharp roadway curves. During such accidents centrifugal force tends to propel the occupant against an interior side of the automobile. There is restraining means to prevent the momentum from forcing the occupant 3 from behind the shields. The upper portion of the operator's body straddles the upper portion of the shield S, as his arms are extended past the side edges of the shield S. The straddling position allows the occupant 3 to press and hold the upper portion of his torso against the shield S during a collision in which the automobile veers. Arms L restrain the mid portion of his torso from yielding sideways. The belt B restrains the lower portion of his torso from being forced towards a side of the vehicle. The knee shield K and the foot shields NR and NL restrain the occupant's legs from being forced aside. The shoulder supports 15 and the belt B confine the occupant 3 to limit his movement upwardly from bouncing action or when the automobile rolls over. Present day automobiles have very short deceleration paths for the occupants, so the seat J may be moved back just before a collision to provide a longer deceleration path. Power means may be used to move the seat J and thus the shields towards the rear. The seat may be adjusted back and forth.

The seat J has a high back with a portion behind the occupant's head, like seats in long distance buses and trains.

The barrier Q may be kept in the retracted raised position as shown in FIG. 5, from which position it can be quickly moved to protective position in front of an occupant as shown in FIG. 1, when there is imminent danger of there being an accident. The barrier Q may be pivoted to the retracted overhead position as shown in FIG. 5 to create access space for the occupant 3 to enter and leave the seat J and to allow the occupant 3 to be visible by not obscuring the upper portion of his body. The knee shield K can also be kept in the retracted position shown in FIG. 5 until there is imminent danger of there being a collision. Therefore, the barrier Q and the shield K may be kept in a retracted position much of the time so they will not materially obstruct or obscure the visibility of the occupant 3. The barrier Q may be retracted quickly after a collision to the position shown in FIG. 5, so the occupant 3 can escape quickly from the vehicle when there is a fire hazard or the like.

A safety belt B may be attached to the slidable seat J. The belt B transmits much of the great momentum force of the lower portion of the occupant's body into the seat J, the seat yielding by sliding forward considerably, which movement cushions the lower portion of the body. The safety belt B is a big improvement over common safety belts that are fastened to seats that do not yield forward. The belt B and the shield K co-act to transmit the great momentum of the lower portion of the occupant's torso and the upper portions of his legs into the sliding seat J, so the momentum can be safely absorbed by the cylinders T. The belt B or the shield K may be used alone for less effectively transmitting the occupant's lower torso momentum force into the seat J. Since the belt B and the shield K can transmit the great momentum of the lower portion of the occupant's torso and the legs into the seat J, the occupant's abdomen does not need to be pressured against the shield S, therefore this delicate portion of the body is not likely to be injured, particularly so for women who are pregnant. The belt B may have a conventional buckle 7 to adjust the belt so it is almost taut. The safety belt B has a large bearing surface against the occupant's legs and this bearing engagement restrains the occupant 3 from sliding far in relationship with the seat 3 due to the belt B bearing against his hip bones. The fabric of the belt B may be made of nylon to allow it to yield to a small extent so the occupant 3 can move forward slightly due to his body momentum, so his knees can bear against the shield K and his chest and head can bear against the barrier Q.

When the seat J slides forward during a collision due to the momentum of the occupant 3 and the seat, the offsets 6 on the seat J bear against the ends of the cylinders T and forces springs in the cylinders to compress, which causes the cylinders T to yield and telescope. The cylinders T are bolted to the offsets 6. The cylinders T absorb most of the thrust of the operator's body that is thrown against the shields and the safety belt B during a collision. Catches C or the like, that are engaged to cylinders T, prevent objectionable rebounding of the seat J. Rebounding of the seat J would cause the shields to propel the occupant 3 backwards at a high velocity; thus causing him to violently strike the back of the seat and be injured.

When the occupant forsees an accident, he can move his body against the shields just before the collision to obtain a snug fit against the shields and to stretch the webbing 8 of the belt B to make it taut so it grips his hip bones. The occupant 3 can move the seat J back along with the shields to increase his deceleration path or to limit the deceleration flight to bring his body to a stop before it reaches close to the hazardous steering column 2a and the dash board.

When an automobile without a top or with a weak top is involved in a roll-over accident, and the barrier Q cannot be retracted, the arms L may be pivoted downwardly with manual force and the belt B may be unbuckled by quickly manipulating the buckle 7, to allow the occupant 3 to escape to a sheltered position under the dash.

The belt B may have hooks 9 to engage eyes 10 that are attached to the lower portion of shield S. The hooks 9 would restrain the barrier 3 from tilting forwardly from the pressure of the occupant's chest against it during a collision if side arms L are not used. The belt B has horizontal portions 8a to restrain the upper portion of the belt from being pulled forward away from the hips, due to momentum force against the barrier Q. The use of the belt B to restrain the lower portion of the barrier Q is suitable for the use of passengers who are not closely confronted by rigid portions of the vehicle. The arms L would be more effective than hooks 9 to restrain the barrier Q when it is to act as a battering ram.

When preferred, the operator may drive with the head shield H positioned low away from his head in the position Hd. The shield H may also be lowered to position Hd when the vehicle ceiling is too low to raise the barrier Q to the retracted raised position shown in FIG. 5. A phantom or dotted outline indicates the position Hd. The shield H in position Hd is low enough to allow the occupant to see over it to view the road ahead and to the sides.

The pivotal side flaps HR and HL may be lowered when the shield H is in the position Hd, to allow the occupant 3 to increase his field of vision downwardly to the right and left. The side flaps HR and HL are portions of the head shield H that extend backwardly adjacent to the sides of occupant's head. The flaps HR and HL are latched into the protective position as shown in FIG. 15, for flap HR. Flap HL is the reverse of flap HR as shown in FIG. 15. The head shield H has a curved center panel 101. The flap HR has a panel 102 that is attached to the panel 101 with a hinge M1, and a similar hinge M2 that is shown in FIG. 1. A hook or latch 103 is bolted to the panel 102. The latch 103 has a resilient spring center portion that allows it to latch to a catch 104 that is bolted to the panel 101. The cach 104 and a hinge part 105 are fastened to the panel 101 with a bolt 106. The hook 103 and a hinge part 107 are fastened to the panel 102 with a hooked bolt 108. The hinge M1 has a conventional coiled spring 109, which tends to keep the panel 102 in the protective position shown in FIGS. 1 and 15.

When a flap HR and the like is to be lowered, the underside of the hook means 103 is gripped and pressured upwardly to disengage it from the catch 104. Then the outer end of the panel 102 is pivoted downwardly until a latching means on the hinge M1 locks the flap HR in the low position, as shown in FIG. 16. The hooked portion 108a of the bolt 108 engages a slotted catch portion 105a of the hinge part 105. The hook 108a has a thin resilient throat to allow it to yield and engage the catch portion 105a.

Flap HR is pivoted back into the protective position by bending the hook 108a to cause it to disengage from the catch 105a. A cable 110 may be attached to the hook 108a to allow the hook to be pulled to disengage it. A spring 111 may be attached to the cable 110 and a cable 112 to allow the spring 109 to force the flap HR upwardly after disengaging the hook 108a. The cable 112 may be rigged as shown in FIG. 4, so that a pull on the control handle 113 cause the hooks 108a to release the flaps.

When the shield H is positioned low and there are dangerous highway conditions ahead, the controls of latch E on the shield H are tripped to allow the forces in the springs on the hinges 12 to pivot the shield H upwardly. Hinges 12 are like the hinges used for the same purpose on the shields in my Patent No. 2,977,135. The latch E has a tripping means that is responsive to a nudge of the operator's chin or a pull on the handle 113 to start the upward pivoting.

The head shield H may also be raised by the action of the operator's head striking the tripping means of latch E when the head slumps into the shield H, as when the operator falls asleep or otherwise loses consciousness. The shield H is held down in the position Hd by the hold-down latch E. During a collision in which the steering column 2a is pushed inwardly, the buffer P forceably raises the head shield H from the position Hd when the operator has not tripped the controls of the latch E, or the controls have jammed.

The hinges 12 connect the shield H to the shield S. The pins of the hinges may be removable to allow the shield H to be removed readily. Some operators would want to drive with the shield H removed. A shield H may be quickly removed so that another shield H of a different size may be mounted in its place.

A pair of spring shoulder latches 13 are fastened to the panel of shield S. The latches 13 engage slots in the head shield H.

There is a pivotal prop mounted in front of the panel below the shield H. A spring tends to force the prop upwardly. The prop and the latches 13 restrain the shield H from pivoting forwardly from a thrust of the operator's head against it. A cable 14 is fastened to the two shoulder latches 13. The cable hangs down to the center of the panel. A handle 113 is mounted loosely on the cable 14. The operator may pivot the shield H down to the position Hd by gripping the handle 113 with his left hand and pulling it downwardly.

The hinges M2 would be similar to hinges M1, they would differ by not having the hooked portion 108a or the catch portion 105a.

The face or eye shield means V may be made of laminated plastics or laminations of plastics and glass to provide a transparent safe shield. The shield means V has a transparent center panel 114 that is securely joined to the panel 101 and the upper panel 115. The flap HR has a transparent panel 116 which is securely joined to the panel 108. The flap HR has a panel 117 that is like the panel 116. The center panel 114 does not bow outwardly in a vertical direction as the face shield in my patents bows. This flattening of the panel 114 provides more space for an occupant 3 who is operator, to move his arms when turning the steering wheel 2.

A modified head shield (not shown) is similar to the head shield shown in my Patents No. 2,977,135 and No. 3,129,017, but with a flattened center portion to an automatic and transparent pivotal face shield that would be shaped like panel 114. This modification is an improvement to allow an operator more space to move his arms while steering.

The hinged portions 19 of supports D may have springs powerful enough to quickly pivot the barrier Q from a retracted position into the protective position.

These hinged portions 19 are locked with spring latches 20 to retracted and protective positions. Cable means 21 may be used to remotely open the latches 20. Tripping means (not shown) may also be used to open the latches, including bumping a tripping control with the head like that for the shield H. The cables 21, to operate the hinged portions 19, may be rigged through spiral metal tubing 22 like that used in automobiles for small cable rigging. The side arms L may be omitted if there is not an obstruction, such as a steering wheel, in the deceleration path. The supports D may be made strong enough to take thrust from steering wheel without bending back. Shoulder supports 15 should be flanged for providing stiff strong supports. Since the supports D are above the shoulders, the occupant 3 is not confined against escaping quickly during accidents, such as accidents in which an auto burns, and accidents when autos plunge into deep rivers and the like. The operator 3 can escape quickly since he can unbuckle the belt and raise the shield Q. If the supports D jam during an accident, the supports are high enough to allow the occupant 3 to slide out from under the shield S. Seat J may have an inflated cushion (not shown) that may be adjustable in height by selectively varying the pressure. The seat cushion may be narrow so occupant 3 can slide it out from in under him to lower his body so his head can more easily be disengaged from the confines of shield H, or to allow occupant to slide sideways off the cushion to so lower his head.

The supports D are threaded so they may be adjusted by rotating the knurled nuts 23 to position the shield S farther or closer to the back of the seat J. These adjustments allow the shielding to be positioned to suit occupants of different build. The supports D may be adjusted by rotating the knurled nuts 24 to position the arms higher or lower to thus selectively position the barrier Q vertically.

The seat J is mounted on a track having two rails 25. The rails 25 are fastened to the floor of the automobile body 1. The seat J has a base 26 which engages the rails 25. A turntable 27 is mounted on the base 26. The metal framework 28 of the seat J is mounted on the turntable 27. A spring latch 29 engages notches on the turntable 27 to allow selective pivoting of the seat J. A pair of track latches 30 may be used to latch the seat J to the rails 25 to restrain the seat from moving except when a violent deceleration force shears the latches 30 if they are engaged to the rails. The latches 30 may be rigged with cables 31, as shown in FIG. 1. The cables 31 pull the latches 30 to retract them from the rails 25 when the barrier Q is lowered to the protective position shown in FIG. 5. The cables 31 act with drum action by winding and unwinding on supports D.

The motor operated hydraulic pump 32 may be used to adjust the cylinders T to laterally adjust the seat J. The reservoir 33 works with the pump 32. The cylinders T may bleed hydraulic fluid (not shown) to cushion momentum thrusts.

Side arms L may be used as separators to restrain the barrier Q from tilting when pressured by the occupant 3 during a collision or when the steering wheel 2 engages it. The arms L also restrain the occupant 3 from being thrown sideways. The arms L may be covered with sponge rubber cushioning or the like. The arms L would be retracted as shown in FIG. 5 when the barrier Q is retracted. The outer end of each arm L is grooved deeply to engage a hook HK when the arms L are in the protective position as shown in FIGS. 1 and 4. Hooks 34 are offset out from the bottom of the shield S. Each arm L has a large pin portion 35 at right angles to its longitudinal axis to engage the upright metal framework 28 in the back of the seat J. There is a cable 36 on each side of the barrier Q. Each cable 36 is anchored to the pin portion 35 and at least partially wrapped around the pin portion 35. The other end of each cable 36 is anchored to and wrapped partially around the rounded pin plate portion 19a of a support D. When a barrier Q is lowered from the retracted position shown in FIG. 5, the upper end of each cable 36 is further wrapped onto the pin plate portion 19a causing a pull on the cable 36, which causes the pin portion 35 to pivot as the cable unwinds and the arm L pivots upwards into the protective position shown in FIG. 1. This drum action partially unwraps or unwinds the lower end of the cable 36 from the pin portion 35. The arms L are therefore self-coupling. A spring 37 may be spliced into each cable 36 to allow each arm L to spring upwards until it engages a hook 34 on barrier Q. Each spring 37 also allows the occupant 3 to force an arm L downwards if the barrier Q jams during a collision and cannot be retracted quickly. The arms L confine the operator 3 but they do not trap him against escaping. Arms L are positioned to allow occupant's arms to be held close to the torso so they do not project enough to be injured by the adjacent side of automobile body 1 being deformed inwardly during a collision. The arms L have strong tubular shaft portions that can be unthreaded for adjustment and for removal.

The knee shield K may be adjusted laterally by turning the adjusting screws 38 to position the outer extremities further or closer to the occupant 3. The knee shield K is triggered by a control 39 located low on the seat J. The control 39 can be pressured by the left hand or the left heel of occupant 3. The control 39 causes the knee shield K to project to form a circle-like shield to protect the knees of the occupant and to restrain the knees and thus the lower portion of the body from sliding forward away from the seat J. This restraining of the knees allows the body momentum to be transmitted into the seat J so the cylinders T can absorb the momentum. The control 39 is a switch to activate a motor driven hydraulic pump 32 shown in FIG. 3. The pump 32 forces fluid into tubes of the knee shield K to cause the shield to extend. The pump 32 may be reversed to cause them to contract in length. If the pump motor fails because of deformation due to the collision forces, release valve 40 on the knee shield may be turned to release the fluid so that the knee shield can be manually forced to retract. The valve 40 is a needed safeguard as the knee shield could be jammed and trap the occupant 3. The padding or cushioning 41 that confronts the knees forms a portion of the cushioning of seat J until the knee shield K is projected. The side portions of the knee shield K restrain the legs from being thrown towards a side of the occupant's compartment that is deforming under collision forces. Springs (not shown) rather than hydraulic pressure may be used to project the knee shield K.

The space encircled by the projected knee shield K is large enough so the occupant 3 can slide his legs out from the confines of the knee shield K if the shield jams, unless the shield is deformed to a large extent by collision forces. The knee shield K is formed by a strong rigid curved metal tube 42 and shorter curved tubes 43 and 44 that telescope into tube 42. Curved round rods 45 and 46 telescope into tubes 43 and 44. The tubes 43 and 44 and the rods 45 and 46 are telescoped almost their full length into tube 42 when the shield K is retracted as shown in FIG. 7. The tubes and rods may be grooved with keyways and have keys to restrain them from twisting out of alignment. The keyways would be similar to those in the cushioning telescoping cylinders shown in my Patent No. 2,977,135. The hydraulic fluid line 47 connects the tube 42 and the pump 48. Pump 48 is connected to a reservoir 49. There are oil-tight gaskets at the sliding joints of the barrier K. The end of rod 45 has a dowel-like projection to fit a socket in the end rod 46 to make the rods interlock when projected fully. The shield K has curved metal shield plates 50 and 51 securely fastened to the outer ends of rods 45 and 46. Each of the plates 50 and 51 has an open clasp that loosely engages the tubes 43 and 44 when the shield K is in the protective projected position and the clasps engage tube 42 when the shield K is retracted. Strong fabric bands 52 and 53 are each attached to the center of tube 42 and the outer ends of the bands are attached to plates 45 and 46. Padding 41 is attached to the bands 52 and 53, also to the outer ends of plates 45 and 46. The fabric bands and the padding 41 cushion and protect the legs.

An electric switch type control 39 may be used to simultaneously trigger the shield K and the barrier Q into protective position. Solenoids or the like would be used (not shown) to trip latches on barrier Q.

Foot shields NR and NL restrain the knees and upper portions of legs from sliding under the knee shield K, therefore restraining the lower portion of the torso of the occupant 3 from sliding under the torso shield S, particularly if a safety belt B is not used or if the belt is not adjusted so it grips the hip bones during a deceleration. The belt B attached to the sliding seat K is a big improvement over a safety belt attached to a fixed seat, as the belt B and sliding seat allow the great momentum of the adjacent portion of the body of the occupant to be transmitted into the cushioning cylinders T.

The foot shields NR and NL are attached to the plate 54. Plate PL is connected to the seat J with chains CH. The foot shields NR and NL have strong metal shoe-like shells 55 and 56. During a collision the occupant 3 may quickly move his feet into the shields NR and NL so the momentum of the feet pressures the feet forward against the padding 5. The shields NR and NL restrain the feet from moving ahead faster than the seat J during a collision. The front of the occupant's feet and his shins bear against padding 5 on the foot shields NR and NL to cushion the momentum force during a decleration. The chains 57 that tie the foot shields to the seat J slacken when an unyielding obstruction is struck. The corrugated floor 58 confronting the foot shields NL and NR telescopes with accordion action when pressured by foot shields and the plate 54. Plate 54 allows the shields NR and NL to stop and/or be pushed backwards towards the seat J during a collision when the plate 54 engages the steering column or other rigid objects. Foot shields NR and NL are mounted so they can stop moving before the seat J stops moving. The foot shields NR and NL may stop short of the foot pedals and firewall, particularly if these members are being deformed inwardly. When the occupant's feet are positioned in the shields NR and NL, the occupant's legs are bent at the knees so they are less likely to be stoved when decelerated violently.

The bent plate 59 is attached to the front of the seat J. Plate 59 acts as a ramp for the foot shields NR and NL when they stop and the seat J moves closer to them. The ramp action causes the foot shields NR and NL to tilt forcing the feet to tilt so they can come closer to the seat J. If the seat J continues to move forward and the foot shields are restrained by obstructions, the knee shields NR and NL can force the ramp plate 59 to bend and telescope with accordian action where it is corrugated, thereby allowing the foot shields to stand on end closely against the seat J, with the occupant's toes pointing downwardly. This action provides a longer deceleration path for the seat J without causing the occupant's feet to be crushed by deformation of the front of the occupant's compartment confronting him. Such deformation is a hazardous factor, as the vehicle motor is sometimes pushed towards the occupant 3 during a collision. When the seat J moves close to the foot shields NR and NL, the guides 60 and 61 restrain the plate 59 and thus the foot shields from moving out of alignment. The guides 60 and 61 are pivotally connected to the plate 54 to allow the plate and foot shields to tilt to an extent. Offsets on the guides engage raised offsets on the plate 54 to limit the tilting.

An automobile with a ceiling may have a spring latch on the ceiling (not shown) to hold the front end of the barrier Q when it is in a retracted position, to restrain it from bouncing. The barrier Q may have a counterweight (not shown) or springs to act like a counterweight to allow it to be retracted with little effort. Strong operators could raise and lower the barrier Q without any spring means, but those of frail build would need such force means.

The combination shown in FIG. 1 is costly, but it furnishes maximum protection. When such an arrangement is not suitable for a particular vehicle, more limited protection can be provided by using arrangements shown in FIGS. 8 and 12.

The modification shown in FIGS. 8 to 11 inclusive has a cushioning cylinder TT mounted on the interior wall of a door 62 of an automobile body 1d. The barrier W is cantilevered out from the cylinder TT. The barrier W is similar to barrier Q shown in FIG. 1.

The barrier W is shown positioned in front of a seat JD. The seat JD is shown interconnected with the cylinder TT and the barrier W. At least a portion of the seat JD slides in unison with the barrier W when the occupant 3 of the seat is propelled forwardly by his momentum when the vehicle is decelerated quickly due to a collision.

The barrier W may be positioned in front of a tiltable seat that must be tilted to allow access space for entering and leaving the rear of the occupant's compartment. Such a tiltable seat is not readily adaptable for supporting a shield Q.

The barrier W with its support is not as strong as the barrier Q and its supporting means. The barrier W is more suitable for use to protect occupants who are frail of build, particularly women, who could not manipulate the heavy barrier Q. The door 62 with the barrier W mounted from it could be readily swung open and be closed by a person frail of build. The barrier W is always in the protective position when the vehicle door is closed, thus the occupant cannot circumvent its protective features. The barrier W can swing with the door 62 to allow more access space for the occupant 3 to enter or leave the seating compartment. This is a more simple means to create an access space than the similar arrangement shown in my Patent No. 2,977,135. The barrier W cannot bounce due to a rough roadway as the similar old barrier can bounce. The supports for the cylinder TT may be made so the cylinder is positioned higher or lower than the position shown. The combination shown in FIG. 8 would be less costly and more easily installed in present day automobiles than could the combination shown in FIG. 1.

The gap between the head shield H and the back of the seat JD allows the occupant 3 to move from behind the barrier W in case the vehicle rolls over during an accident. The lower seat portion 63 on which the occupant 3 sits may yield forward without the seat 64 moving forward. This means allows him to escape easier from a deeply dished head shield.

Barrier W is mounted less strongly than is the barrier Q to furnish more limited protection, but it does not have objectionable characteristics such as obscuring portions of the occupant's head when shielding is retracted. The occupant 3 can slide sideways past the shields SS and H to escape being trapped by the shielding after a collision. The occupant 3 may place his hands and arms across the front of his abdomen behind the shield SS to cushion his arms during a collision, more so if shoulder shields are used to cushion upper portions of his arms.

The rearwardly projecting portion of cylinder TT restrains seat JD from pivoting forwardly during a deceleration. This is an improvement over conventional arm rest on a door for preventing a hinged seat from tilting forward. The cylinder TT is strong and, if it is propelled backwardly by the deformation of the front of the automobile body 1d, the rear of the cylinder TT can strike the channel iron portion 65 of the seat framing and force the seat JD backwardly, the barrier W, pushing the occupant 3 towards the rear. A gap is maintained between the barrier W and the back of the seat JD. The gap prevents occupant 3 from being crushed between the back of the seat JD and the barrier W. The seat-back 64 extends close to the adjacent side of occupant's compartment so it can restrain the side of the automobile body 1 from deforming inwardly to the extent that the occupant's arm adjacent to the side of the compartment cannot be crushed by the deforming members. The front of the cylinder TT bears against the firewall 66 close to the side framing of the automobile body 1, adjacent the door 62 so the forward portion of the cylinder TT is restrained from moving forward. The tracks 67 and 68 on the door 62 support the cylinder TT. The barrier W is cantilevered from the cylinder TT to a position confronting the occupant 3. The front portion of the cylinder TT forward of the door 62 swings inwardly when the door 62 is opened. When the door 62 is opened to an extent, the two pins 69 retract from notches 70 in seat JD, allowing the barrier W to be moved forward against the steering wheel 2 so there is more access space for the occupant 3 to leave or take his seat. Since the barrier W is mounted on the door 62, the door 62 has strong hinges and a strong latch. Safety door latching may be similar to latching shown in my Patent No. 2,827,305.

The barrier W is adjusted laterally to obtain a position that allows a gap between the operator 3 and the shields S and H. Air can circulate through the gap allowing the operator 3 to keep cool while driving during hot weather. The pins 69 are selectively engaged to the spaced slots 70 in seat base 71 to adjust the seat laterally.

There are three T-shaped connectors 72 attached to the shell of cylinder TT. The connectors 72 have sliding and interconnecting engagement with track 67 that is fastened to door 62. This side positioning of the cylinder TT would always be clear of the steering wheel 2.

The pins 69 are fastened to the tubular framework 73. The frame work 73 is fastened to the cylinder TT and to the track 68. Two connectors 72 fasten onto the framework 73 and slidably engage the track 68.

The seat JD is mounted similar to seat J. The rails 74 are fastened to the floor. The seat base 71 engages the rails 74. A seat latch 75 may be used to latch the seat JD to the rails 74. The seat back 64 may be made detachable from the seat portion 63. A retractable pin 76 may be disengaged after the seat JD is adjusted laterally so that seat portion 63 may yield forward during a deceleration, while the latch 75 holds the back of the seat back 64 so it will not yield forward during a collision. This yielding of only the seat portion 63 creates a large gap behind the occupant 3 to allow him to escape easily if the barrier W jams during a collision.

The pins 69 may engage slots in the tubular framework 73. The pins 69 may be secured with bolts that project upwardly from the bottom of the framework 73. The pins 69 may be omitted if the seat JD is not slidably mounted.

The cylinder TT and the cylinders T may have adjusting means (not shown) to adjust the force absorbing spring or hydraulic bleeding means to suit the weight of the occupant being protected. Such adjusting means are well known. They are an adjustable diaphragm opening to vary the hydraulic bleeding action and take-up means to vary the spring means.

The barrier W has a torso shield SS which is similar to the shield S. The shield SS is attached to the cylinder TT with a hinge G. The hinge G has a handle which can be pivoted to disengage the barrier W from the cylinder TT. Such a hinge is described in my Patent No. 2,977,135.

The shield SS of the barrier W is braced with the brace BR shown in FIGS. 8 and 11. The brace BR may be buckled at its center to allow the inner portion of the barrier W to be swung towards the wheel 2, so as to allow the barrier to swing clear of the occupant 3 when the door 62 is swung open or when it is swung closed. The brace BR has bar 77 which is pivotally mounted on the cylinder TT. Another bar 78 is pivotally mounted on the shield SS. Bars 77 and 78 are pivotally connected. A short sliding tube 79 slips over the pivotal connection of bars 77 and 78. A spring 80 bears against the tube 79 and an offset on bar 77. When the inner portion of barrier W is to be pivoted towards the wheel 2, the tube 79 is gripped and pushed towards the cylinder T, thus compressing the spring 80, then the brace BR buckles at its center as shown by the dot-dash outline when the barrier is pivoted. The tube 79 may be turned to engage a catch (not shown) such as a bayonet fitting to prevent the tube 79 from moving and straightening the brace BR when such action is not wanted. When an occupant 3 is ready to operate the vehicle, he turns tube 79 which allows spring 80 to force the tube 79 to straighten the brace BR.

An occupant who is not closely confronted by a rigid object such as a steering wheel, may travel with the barrier W retracted toward the side of a door. The brace BR would be buckled to shorten it to allow the barrier to be retracted until it is needed.

The foot shields NR and NL are mounted on plate 81 which is similar to plate 54. The bent plate 82 is similar to plate 59. Plate 81 has offsets to engage rails 74 to allow the plate to slide in the deceleration path.

The hydraulic pumps 32 and 48 act with cylinder TT and knee shield K as they do for the cylinders T and the knee shield K in the arrangement shown in FIGS. 1–7.

A modification having retractable fabric barrier Y is illustrated by FIGS. 12, 13 and 14. The barrier Y would be more suitable for many persons than would the barrier Q and W. The barrier Y may be made largely of strong pieces of cloth fabric 83 such as nylon fabric or canvas. The barrier Y shields the occupant 3 from being thrown against rigid objects. The barrier Y cannot act as a battering ram, but it would be suitable for occupants of vehicle seats who are not closely confronted by a rigid object, such as a steering wheel, that is within its deceleration path. The pieces of fabric 83 provide cushioning surfaces that yield to conform to the features of the occupant 3 that are forced against them during a collision. The soft surfaces of the pieces of fabric 83 provide large even bearing surfaces for the occupant's features, thereby allowing a great momentum to be widely distributed through the barrier Y into the seat JB.

The barrier Y may have a tough, flexible, transparent plastic face or eye shield 99. The shield 99 is fastened to the shielding above and below it. The shield 99 may be made of a tough plastic, such as the transparent plastic sold under the trade name "MYLAR." The shield 99 would fold when the barrier Y is retracted. The shield 99 would tend to stop small pieces of broken glass from striking occupant's face during a collision.

The barrier Y may be fastened to the back of a sliding seat JB. Seat JB would be similar to sliding seat J. The seat JB should have limit stops to limit the forward movement of the seat during a violent deceleration, so as to prevent momentum from propelling the occupant 3 against rigid objects such as the dash board and steering wheel column. The barrier Y may be used by an operator 3 who is confronted with a steering wheel 2 having a depressed hub. Such a wheel 2 can bend and yield considerably when pressured by the arms of the operator during a violent deceleration. The barrier Y would furnish a large degree of protection from a steering wheel 2 when it is used along with a buffer plate P. The buffer plate P should be padded on the side confronting the operator. The barrier Y would furnish a great degree of protection when used along with a safety belt B that is also fastened to the sliding seat JB. The barrier Y may also be used effectively along with a knee shield K and foot shield NR and NL. The barrier Y may be mounted on a bracket (not shown) which may be cantilevered out from a cylinder TT or the like that is mounted on the interior of a vehicle.

The barrier Y would generally be kept in the retracted position shown in FIG. 14 until a hazardous condition warranted tripping a latching mechanism having two spring latches 84 to force down the pieces of fabric 83 to the protective positions shown in FIG. 12. When the barrier Y is kept retracted, it does not obscure the occupant's head and shoulders from the field of vision of people passing by, thus the occupant 3 can appear natural and unencumbered by the barrier Y. The retracted barrier Y would fold to an extent and thus be telescoped, making it inconspicuous and non-objectionable in appearance. The barrier Y may be made in pleasingly attractive colors. The barrier Y would be preferred by many persons because it would be low in cost to build compared to the barriers Q and W, also because it would be compact and light in weight and thus easily mounted and manipulated.

When the barrier Y is in a protective position, its torso or chest shield or guard SF extends forward and confronts at least a portion of the chest of the occupant 3. The barrier has an intermediate or chin shield on guard CF confronting the chin of the occupant 3. The shield CF may have air holes confronting the occupant's mouth. The barrier has an upper or head shield or guard HF confronting at least a portion of the forehead of the occupant 3. Horizontal tubes 85 and 86 are mounted on the upper portion of the back of the seat JB. There is a strong vertical rod 87 attached to the adjacent ends of the tubes 85 and 86. Each rod 87 acts as a rail for a short flanged tube 88 that anchors an end of the shield SF. Each end of the shield SF is looped around a short tube 88. The short tubes 88 slide on the rods 87 when the barrier Y is retracted or when it is forced down into the protective position shown in FIGS. 12 and 13. Each short tube 88 has a slender metal rod or wire 89 pivotally connected to it. Each metal wire 89 is engaged to the lower edging of the fabric 83 of the shield SF. Each wire 89 projects outwardly beyond the chest of the occupant 3 so as to shape the fabric 83 so it will engage the occupant's chest. The wires 89 should be slightly flexible. The shields HF and CF are pivotally mounted to hinges 90 that are supported by the tube 85. The shield CF has a slender metal rod or wire 91 engaged to its fabric's edging and projecting out from each hinge 85 to shape the fabric 83 of this shield so it will engage the chin of the occupant 3 when it is forced downwardly into the protective position. There is a stiff metal link 92 on each side of the barrier Y pivotally connecting a wire 91 to a wire 89, thus connecting shield CF to shield SF. The pivotal connections of the wires 89 to the short tubes 88 have common springs that tend to cause the wires 89 to pivot upwardly and thus tilt the shield SF, retracting the barrier. The links 92 force the wires 89 downwardly and thus the fabric 83 of the shield with it, to the horizontal position shown in FIG. 12. The hinges 90 have springs that force down the shield CF which causes the links 92 to push down the shield SF. The springs 90 are oppositely mounted, but similar to the springs 12 that force the shield H from a retracted position to a protective position. The shield HF is pulled down by the shield CF to which it is connected with side straps 93. The shield HF has a wide band of fabric 83 across its top to engage the top of the head of the occupant 3 and thus limit the downward movement of the shield HF. The shield HF has wire edging 94. A strap 95 connects the shield CF with the shield SF to limit the downward movement of the shield SF.

The occupant 3 would move his head and shoulders back against the seat JB just before unlatching the spring hinges 90 to cause the barrier to move from a retracted position to a protective position. The shields SF, CF, and HF would not fall short of the occupant 3 when he has his head and shoulders tilted back. The spring latches 84 can be simultaneously tripped by rigging them with light cables or cords 96 and 97 so that a control knob 98 can be positioned close to occupant 3 so he can quickly reach it to pull it to trigger the latches 84 so the barrier Y is forced down into the protective position. The knob 98 shown is positioned so an operator 3 can quickly move his hand from a steering wheel 2 to pull the knob. The knob 98 may be attached to a stiff wire (not shown) that is cantilevered out from the seat JB above the shoulder of the occupant 3 but not touching him. One end of the cable 97 is fastened to the cable 96, and the other end is rigged around the back of the seat JB to a latch 84 on the other side of the seat.

Barriers Q, W, Y and the like may be rigidly mounted and be used in vehicles in conjunction with bumper-like barriers that yield and cushion to a great extent when they strike an obstruction. These bumper-like barriers are described in my Patent No. 3,056,462. An auto body portion, such as those described in my Patent No. 3,056,627, entitled Safe Vehicle Body, that act similar to the bumper-like barriers may also be used in conjunction with the barriers Q, W, Y and the like. The rigid mounting of the barriers Q, W, Y and the like would be necessary in small vehicles including small automobiles which are so compact that an adequate deceleration path cannot be furnished within the occupant's compartment. Conventional bumpers yield little without breaking, so they would not provide the long gradual deceleration of the bumper barriers and the like. Barriers Q, W, Y and the like may obviously be mounted so as to have yieldable cushioning means and rebound preventing means positioned differently from the yieldable means of the telescoping cylinders. For example, springs and catches may be mounted in the trunk of a vehicle, with cables connecting a barrier to the springs.

These barriers may have means (not shown) to allow the occupant to manually propel them back along with the sliding seat to which they are engaged. This means to manually position the barriers laterally is described in my Patent No. 2,977,135.

Thus it will be seen that I have provided an efficient and strong safety barrier which, by its shape and yieldable means, makes it possible to cushion and absorb violent collision forces and thus protect an occupant of a motor vehicle or other conveyance.

While I have illustrated and described several specific embodiments of my invention, it will be understood that these are by way of illustration only, and that various changes and modifications may be made within the contemplation of my invention and within the scope of the following claims.

I claim:

1. In a vehicle having a seat for an occupant, in combination, a shield means confronting at least a portion of the front of the occupant, support means mounted in said vehicle, said support means including means for supporting said shield means in a substantially vertical position, a lower portion of said shield means confronting at least the chest of said occupant, an upper portion of said shield means confronting at least a portion of the head of said occupant, said upper portion including a bearing surface means confronting the forehead of said occupant, at least said upper portion being pivotally mounted to allow it to be retracted downwardly, said pivotally mounted upper portion including locking means for locking it in the said vertical position confronting the head of said occupant, said shield means being of a construction to allow said occupant to see therethrough, said upper portion including a pair of pivotally mounted side flap portions extending backwardly adjacent to at least portions of the sides of said occupant's head, said locking means including means to lock said pair of flaps into protective positions, said upper portion including means to lower said flap portions that extend upwardly when said upper portion is retracted downwardly, to allow clear space for viewing, said support means being yieldable in a forward direction of said vehicle for allowing yieldable movement of said shield means in a forward direction of said vehicle in response to the momentum thrust of said occupant against said shield means due to a high degree of deceleration of said vehicle, thereby restraining said occupant from being injured, and yieldable force absorbing and rebound-preventing means to gradually absorb said momentum thrust and thereby cushion said occupant during the deceleration of said vehicle and prevent rebound of said occupant.

2. A combination as recited in claim 1 together with tripping means operated by said occupant for moving said upper portion of said shield means into said protective position.

3. A combination as recited in claim 1 wherein said upper portion includes retraction latching means to lock said flaps in said lowered positions.

4. A combination as recited in claim 1 wherein said upper portion includes tripping means to cause said flap portions to move into said protective positions.

5. A combination as recited in claim 1 wherein said flap portions include transparent plastic portions.

6. A combination as recited in claim 4, wherein said tripping means includes spring means to force said flap portions into said protective positions.

References Cited by the Examiner

UNITED STATES PATENTS

| | | | |
|---|---|---|---|
| 2,977,135 | 3/1961 | Graham | 280—150 |
| 3,129,017 | 4/1964 | Graham | 280—150 |

BENJAMIN HERSH, *Primary Examiner.*

W. A. MARCONTELL, *Assistant Examiner.*